United States Patent [19]

Matsuda et al.

[11] Patent Number: 4,818,880
[45] Date of Patent: * Apr. 4, 1989

[54] RADIATION IMAGE READ-OUT APPARATUS

[75] Inventors: Terumi Matsuda; Toshitaka Aagano; Junji Miyahara; Nobuyoshi Nakajima; Shigeru Saotome, all of Kanagawa, Japan

[73] Assignee: Fuji Photo Film Co., Ltd., Kanagawa, Japan

[ * ] Notice: The portion of the term of this patent subsequent to Jul. 14, 2004 has been disclaimed.

[21] Appl. No.: 710,209

[22] Filed: Mar. 11, 1985

[30] Foreign Application Priority Data

Mar. 9, 1984 [JP] Japan ................................. 59-45077
Nov. 28, 1984 [JP] Japan ................................ 59-250704
Jan. 10, 1985 [JP] Japan ..................................... 60-2479

[51] Int. Cl.$^4$ .......................... G01N 23/04; G03C 5/16
[52] U.S. Cl. .................................................. 250/327.2
[58] Field of Search ......................... 250/327.2, 484.1

[56] References Cited

U.S. PATENT DOCUMENTS 4,485,302 11/1984 Tanaka et al. .................. 250/327.2
4,517,463 5/1985 Gasiot et al. ..................... 250/327.2
4,680,473 7/1987 Matsuda et al. ................. 250/484.1

Primary Examiner—Carolyn E. Fields
Attorney, Agent, or Firm—Sughrue, Mion, Zinn, Macpeak & Seas

[57] ABSTRACT

A radiation image read-out apparatus comprises an optical system for scanning a stimulable phosphor sheet carrying a radiation image stored therein by stimulating rays, a light guide member for guiding light emitted by the stimulable phosphor sheet upon exposure to stimulating rays, and a photoelectric converter for detecting the guided light. A film for preventing reflection of stimulating rays is closely contacted with a light input face of the light guide member. Or, a filter for absorbing the stimulating rays reflected by the stimulable phosphor sheet and transmitting the light emitted by the stimulable phosphor sheet is positioned between the stimulating ray incidence point on the stimulable phosphor sheet and the light input face of the light guide member.

10 Claims, 3 Drawing Sheets

RADIATION IMAGE READ-OUT APPARATUS

BACKGROUND OF THE INVENTION

1. Field of the Invention

This invention relates to a radiation image read-out apparatus in a radiation image recording and reproducing system using a stimulable phosphor sheet.

2. Description of the Prior Art

A radiation image recording and reproducing system using a stimulable phosphor sheet is disclosed, for example, in U.S. Pat. Nos. 4,258,264 and 4,315,318, and Japanese Unexamined Patent Publication No. 56(1981)-11395. The system was also announced at meetings of the radiation society, in "Nikkan Kogyo Shinbun" (Daily Industrial Newspaper), June 23, 1981 edition, page 16, and elsewhere, and attracted attention in various fields.

The aforesaid radiation image recording and reproducing system is capable of providing various radiation images useful for viewing, particularly for diagnostic purposes, which could not be obtained by conventional radiography using a silver halide photographic material. Moreover, the radiation image recording and reproducing system can further provide improved diagnostic effects when combined with an up-to-date medical image recording technique such as computed tomography (CT) or introduction of radioisotope into the human body. Therefore, the system is very effective for viewing purposes, particularly for medical diagnosis.

The aforesaid radiation image recording and reproducing system generally carries out the steps of (i) recording (storing a radiation image in a stimulable phosphor sheet), (ii) read-out (converting the stored image into an image signal, and sometimes storing the read-out image signal on a conventional medium such as magnetic tape), and (iii) reproducing (converting the image signal into a visible image, i.e. displaying the visible image on a display device such as a cathode ray tube (CRT) or permanently recording the visible image on a recording medium such as photographic film). The present invention is concerned with the read-out step in the aforesaid radiation image recording and reproducing system.

FIG. 1 is a schematic view showing an example of a radiation image read-out apparatus employed in the aforesaid radiation image recording and reproducing system.

In the apparatus of FIG. 1, a laser beam 1a of a predetermined intensity is emitted as stimulating rays from a laser beam source 1 to a galvanometer mirror 2. The laser beam 1a is deflected by the galvanometer mirror 2 to form a laser beam 1b impinging upon a stimulable phosphor sheet 3 positioned below the galvanometer mirror 2 so that the stimulable phosphor sheet 3 is scanned by the laser beam 1b in the main scanning direction, i.e. in the width direction of the sheet 3 as indicated by the arrow A. While the laser beam 1b impinges upon the stimulable phosphor sheet 3, the sheet 3 is conveyed in the sub-scanning direction as indicated by the arrow B, for example, by an endless belt device 9. Therefore, scanning in the main scanning direction is repeated at an angle approximately normal to the sub-scanning direction, and the whole surface of the stimulable phosphor sheet 3 is two-dimensionally scanned by the laser beam 1b. As the stimulable phosphor sheet 3 is scanned by the laser beam 1b, the portion of the sheet 3 exposed to the laser beam 1b emits light having an intensity proportion to the stored radiation energy. The light emitted by the stimulable phosphor sheet 3 enters a transparent light guide member 4 from its light input face 4a positioned close to the sheet 3 in parallel to the main scanning line.

The light guide member 4 has a flat-shaped front end portion 4b positioned close to the stimulable phosphor sheet 3 and is shaped gradually into a cylindrical shape towards the rear end side to form an approximately cylindrical rear end portion 4c which is closely contacted with a photomultiplier 5. The light emitted by the stimulable phosphor sheet 3 upon stimulation thereof and entering the light guide member 4 from its light input face 4a is guided inside of the light guide member 4 up to the rear end portion 4c, and received by the photomultiplier 5. A filter 16 transmitting the light emitted by the stimulable phosphor sheet 3 and absorbing the stimulating rays is positioned between the rear end portion 4c of the light guide member 4 and the photomultiplier 5, thereby intercepting the stimulating rays entering the light guide member 4 by being reflected by the stimulable phosphor sheet 3 after impinging thereupon. Therefore, only the light emitted by the stimulable phosphor sheet 3 is guided to the photomultiplier 5. Thus the light emitted by the stimulable phosphor sheet 3 in proportion to the radiation energy stored therein is detected and converted into an electric image signal by the photomultiplier 5. The electric image signal thus obtained is sent to an image processing circuit 6 and processed therein. The electric image signal thus processed is then reproduced into a visible image and displayed, for example, on a CRT 7, or is stored in a magnetic tape 8.

However, in the radiation image read-out apparatus arranged as described above, a problem arises when the stimulable phosphor sheet 3 is scanned by the laser beam (stimulating rays) 1b. Namely, the laser beam 1b impinging upon the stimulable phosphor sheet 3 is reflected by the sheet 3 to the light input face 4a, and is further reflected by the light input face 4a to portions of the sheet 3 that have not yet been scanned, thereby stimulating the non-scanned portion and causing it to emit light. When light is emitted by the non-scanned portion of the stimulable phosphor sheet 3 outside of the scanned portion thereof, the light is guided by the light guide member 4 together with the light emitted by the scanned portion of the sheet 3, and is processed as if it were image information from the scanned portion. Therefore, the reproduced image thus obtained becomes incorrect.

FIG. 2 is an enlarged perspective view showing the section near the point 3a of FIG. 1. The aforesaid problem will further be described with reference to FIG. 2 by using as an example the laser beam 1c at a given instant in the scanning by the laser beam 1b in FIG. 1 as an example. The point 3a on the stimulable phosphor sheet 3 exposed to the laser beam 1c emits light in proportion to the radiation energy stored therein upon stimulation by the laser beam 1c. At the same time, the laser beam 1c impinging upon the point 3a is partially reflected and scattered by the point 3a. A part of the laser beam reflected and scattered is further reflected by the light input face 4a of the light guide member 4 as indicated, by way of example, by arrows 11a and 11b, and impinges upon non-scanned portions of the stimulable phosphor sheet 3 outside of the point 3a, thereby stimulating the non-scanned portions and causing them to emit light.

SUMMARY OF THE INVENTION

The primary object of the present invention is to provide a radiation image read-out apparatus in which stimulating rays impinging upon a stimulable phosphor sheet and reflected thereby to the light input face of a light guide member are not reflected by the light input face.

Another object of the present invention is to provide a radiation image read-out apparatus realizing a reproduced visible image of high image quality.

The present invention provides a radiation image read-out apparatus including a scanning optical system for scanning a stimulable phosphor sheet carrying a radiation image stored therein with stimulating rays, a light guide member having a light input face positioned in the vicinity of a portion of said stimulable phosphor sheet scanned by said stimulating rays, said light guide member guiding light, which is emitted by said stimulable phosphor sheet in proportion to the stored radiation energy when said stimulable phosphor sheet is scanned by said stimulating rays, from said light input face, and a photoelectric converter for receiving the light guided by said light guide member and photoelectrically converting it into an electric signal, wherein the improvement comprises the provision of:

(i) a stimulating ray reflection preventing means positioned between said portion of said stimulable phosphor sheet scanned by said stimulating rays and said light guide member, and (ii) a means for preventing transmission of said stimulating rays and transmitting the light emitted by said stimulable phosphor sheet in proportion to the radiation energy stored, said means being positioned between said portion of said stimulable phosphor sheet scanned by said stimulating rays and said photoelectric converter.

In the present invention, the stimulating ray reflection preventing means may be a stimulating ray reflection preventing film positioned on the light input face of the light guide member, and the means for preventing transmission of stimulating rays and transmitting the light emitted by the stimulable phosphor sheet may be a filter positioned at the photoelectric converter for selectively transmitting the light emitted by the stimulable phosphor sheet. Alternatively, the stimulating ray reflection preventing means and the means for preventing transmission of stimulating rays and transmitting the light emitted by the stimulable phosphor sheet may be constituted by a single filter for absorbing the stimulating rays and transmitting the light emitted by the stimulable phosphor sheet. In this case, the filter is positioned between the position where stimulating rays for scanning the stimulable phosphor sheet impinge upon the stimulable phosphor sheet and the light input face of the light guide member.

In the present invention, since the stimulating ray reflection preventing means is positioned between the position where stimulating rays for scanning the stimulable phosphor sheet impinge upon the sheet and the light guide member, stimulating rays impinging upon the sheet and reflected thereby are not reflected by the light input face of the light guide member. Therefore, no light is emitted by the nonscanned portions of the stimulable phosphor sheet outside of the scanned portion thereof, and it is possible to obtain a reproduced visible image of high image quality.

DESCRIPTION OF THE PREFERRED EMBODIMENTS

The present invention will hereinbelow be described in further detail with reference to the accompanying drawings.

Figure 1:
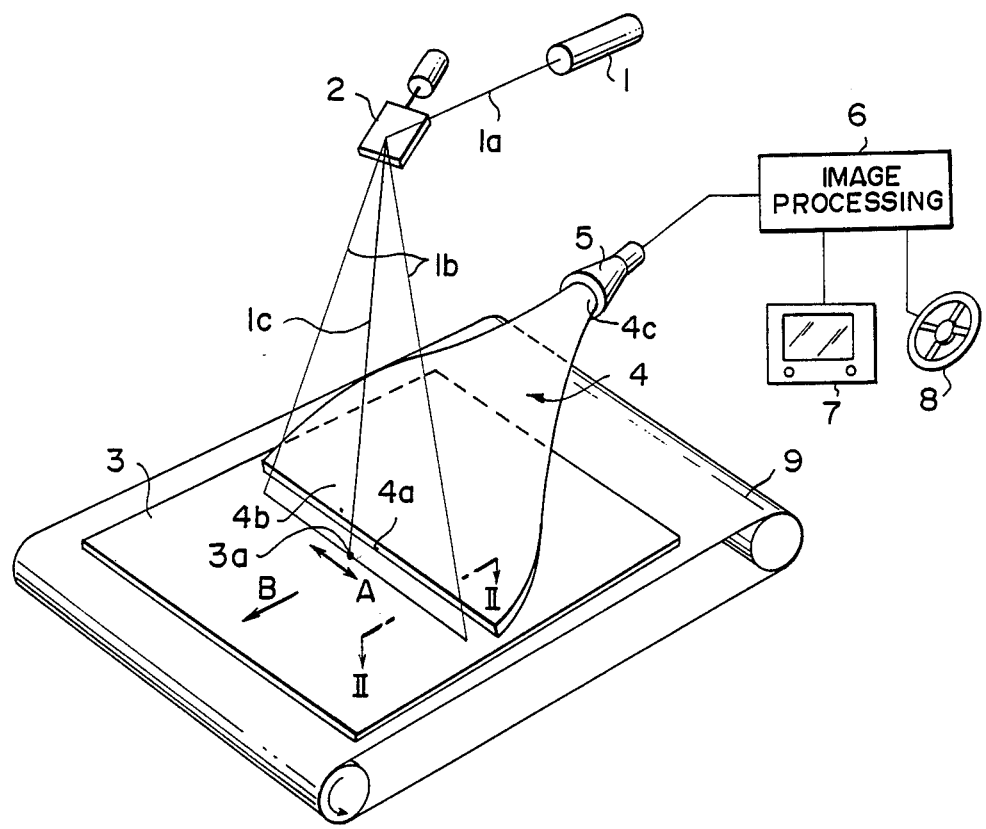
FIG. 1 is a schematic view showing the conventional radiation image read-out apparatus.
Figure 2:
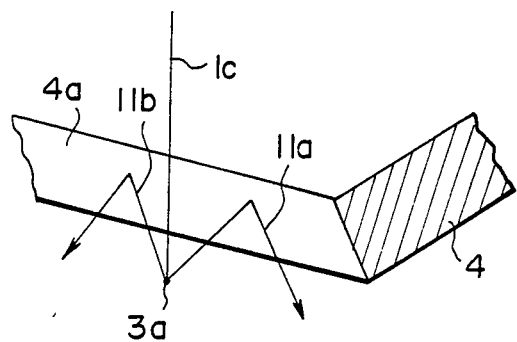
FIG. 2 is an enlarged perspective view showing the section near the point 3a of FIG. 1.

The embodiments of the radiation image read-out apparatus in accordance with the present invention as shown in FIGS. 3 to 8 have a configuration similar to the configuration of the conventional apparatus shown in FIG. 1 except for the provision in the present invention of a stimulating ray reflection preventing film, a filter for absorbing the stimulating rays and transmitting the light emitted by the stimulable phosphor sheet, and a light guiding mirror. Therefore, in FIGS. 3 to 8, similar elements are numbered with the same reference numerals with respect to FIG. 1.

Figure 3:
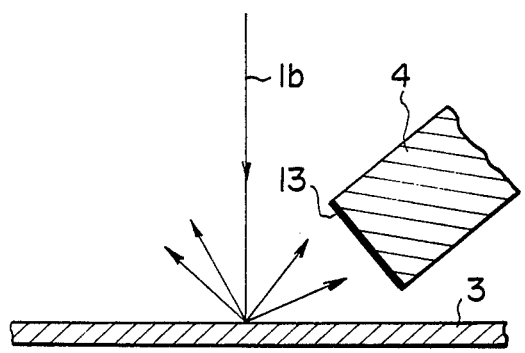
FIG. 3 is an enlarged sectional view showing a part of an embodiment of the radiation image read-out apparatus in accordance with the present invention, which corresponds to a sectional view taken along line II—II of FIG. 1.

Referring to FIG. 3, the light input face of the light guide member 4 positioned along the portion of the stimulable phosphor sheet 3 scanned by the stimulating rays 1b is provided with a stimulating ray reflection preventing film 13 which prevents reflection of the stimulating rays 1b and reflection of the light emitted by the stimulable phosphor sheet 3, thereby efficiently guiding the light emitted by the stimulable phosphor sheet 3 into the light guide member 4. As the stimulating ray reflection preventing film 13 exhibiting such optical property, it is possible to use, for example, a deposited thin film of a material exhibiting a refractive index smaller than that of the material of the light guide member 4. In the case where the deposited thin film is provided, reflection of the stimulating rays 1b becomes minimum when the optical thickness of the deposited thin film is a quarter of the wavelength of the stimulating rays 1b. Reflection of the stimulating rays 1b is completely eliminated when the condition $n1 = \sqrt{n2}$ holds between the refractive index n1 of the deposited thin film material and the refractive index n2 of the light guide member material. When the light guide member 4 is fabricated of a plastic material or glass, the material of the deposited thin film positioned on the light input face of the light guide member 4 may be $MgF_2$, $CaF_2$, cryolite, or the like. The deposited thin film prevents reflection of the stimulating rays 1b and the light emitted by the stimulable phosphor sheet 3. Therefore, the light emitted by the stimulable phosphor sheet 3 is efficiently guided into the light guide member 4. The stimulating rays 1b prevented from reflection by the deposited thin film and guided into the light guide member 4 are absorbed and eliminated by the filter positioned between the light guide member 4 and the photomultiplier 5. The light emitted by the stimulable phosphor sheet 3 and allowed to enter the light guide member 4 since it is not reflected by the deposited thin film passes through the filter and is received by the photomultiplier 5.

The aforesaid deposited thin film is only one example of a stimulating ray reflection preventing film 13 which can be positioned on the light input face 4a of the light guide member 4. The stimulating ray reflection preventing film 13 is not limited to the deposited thin film, and may be constituted by any film insofar as it prevents reflection of the stimulating rays 1b and the light emitted by the stimulable phosphor sheet 3.

Figure 4:
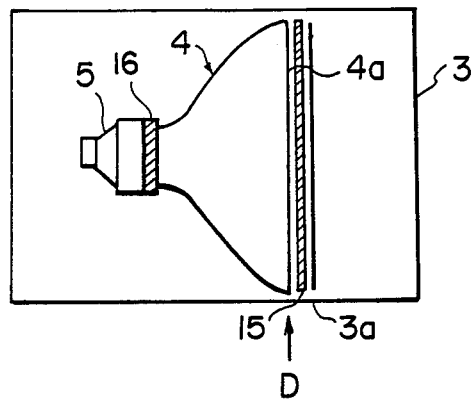
FIG. 4 is a plan view showing another embodiment of the radiation image read-out apparatus in accordance with the present invention.
Figure 5:
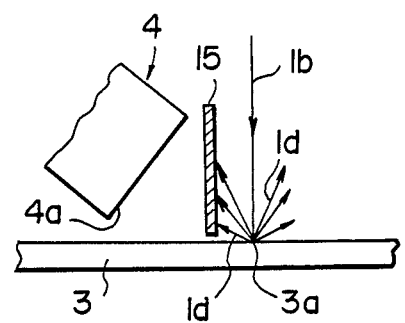
FIG. 5 is an enlarged side view showing a part of the apparatus of FIG. 4, which is taken in the direction as indicated by the arrow D of FIG. 4, FIGS. 6, 7 and 8 are side views showing further embodiments of the radiation image read-out apparatus in accordance with the present invention.

FIGS. 4 and 5 show another embodiment of the radiation image read-out apparatus in accordance with the present invention. In this embodiment, a plate-like filter 15 for absorbing the stimulating rays 1d reflected by the stimulable phosphor sheet 3 and transmitting the light emitted by the stimulable phosphor sheet 3 is positioned between the position 3a, where the stimulating rays 1b impinge upon the sheet 3, and the light input face 4a of the light guide member 4.

The filter 15 may, for example, be a wavelength selection transmitting filter which absorbs the reflected stimulating rays 1d and transmits the light emitted by the stimulable phosphor sheet 3 on the basis of the difference in the wavelength distribution therebetween. As the filter 15, it is possible to use, for example, filter No. B-380 supplied by Hoya Garasu K. K. when the wavelength of the reflected stimulating rays 1d is 633 nm and the wavelength of the light emitted by the stimulable phosphor sheet 3 is 390 nm. Of course, absorption of the reflected stimulating rays 1d and transmission of the light emitted by the stimulable phosphor sheet 3, which are effected by the filter 15, need not necessarily be perfect.

Of the stimulating rays 1d reflected by the stimulating ray incidence position 3a, those directly reflected towards the light input face 4a of the light guide member 4 can be prevented by the filter 15 from impinging upon the light input face 4a.

Figure 6:
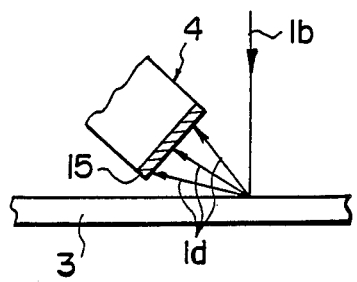

As shown in FIG. 6, the filter 15 may also be closely contacted with the light input face 4a of the light guide member 4.

In the embodiments of FIGS. 4 to 6, the filter 15 is positioned to stand face to face with the light input face 4a or is closely contacted therewith approximately over the entire length of the light input face 4a so that all the stimulating rays 1d reflected in the direction impinging upon the light input face 4a are absorbed by the filter 15. However, the filter 15 may also be positioned only at a part of the light input face 4a.

Also, some filters may exhibit a relatively low transmittance of the light emitted by the stimulable phosphor sheet or slight reflection of the emitted light from the filter surface. When such filters are used, the efficiency of guiding the light emitted by the stimulable phosphor sheet is decreased more or less. In such a case, it is possible to position the filter 15 vertically moveably, for example, in the embodiment of FIG. 4. Normally, the filter 15 is maintained in the upper position to avoid interference with the light emitted by the stimulable phosphor sheet 3. When decrease in the flare phenomenon caused by the stimulating rays reflected by the stimulable phosphor sheet 3 and the light input face 4a is more important than the light guiding efficiency, for example, when a slight difference in contrast should be discriminated as in the case where a tumor image near a portion of the stimulable phosphor sheet exposed to a high radiation dose outside of the object is diagnosed or minute calcification is diagnosed in mammorgraphy, the filter 15 moved down to absorb the stimulating rays 1d reflected to the light input face 4a.

Further, the filter 15 may also be positioned so that it can absorb the stimulating rays 1d reflected from the stimulating ray incidence position 3a to sections of the light guide member 4 outside of the light input face 4a or components of the read-out apparatus other than the light guide member 4. The filter 15 may also be positioned so that it can absorb the stimulating rays reflected by the stimulating ray incidence position 3a and then by some members to the light input face 4a.

Figure 7:
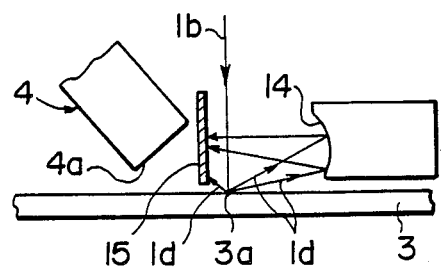
Figure 8:
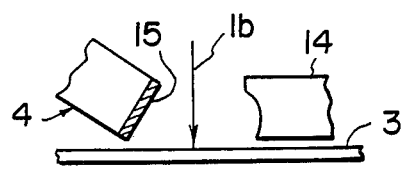

In FIGS. 7 and 8, a reflection mirror 14 is positioned on the side opposite to the light guide member 4 with respect to the stimulating rays incidence position 3a for reflecting the light emitted by the stimulable phosphor sheet 3 to the light guide member 4. The filter 15 is positioned so that is can absorb the stimulating rays 1d reflected by the stimulating ray incidence position 3a toward the light input face 4a of the light guide member 4 and the stimulating rays 1d reflected by the stimulating ray incidence position 3a to the reflection mirror 14 and then reflected by the reflection mirror 14 toward the light input face 4a.

We claim:

1. A radiation image read-out apparatus including a scanning optical system for scanning a stimulable phosphor sheet carrying a radiation image stored therein by stimulating rays, a light guide member having a light input face positioned in the vicinity of a portion of said stimulable phosphor sheet scanned by said stimulating rays, said light guide member guiding light, which is emitted by said stimulable phosphor sheet in proportion to the radiation energy stored when said stimulable phosphor sheet is scanned by said stimulating rays, from said light input face, and a photoelectric converter for receiving the light guided by said light guide member and photoelectrically converting it into an electric signal, wherein the improvement comprises the provision of:

(i) a stimulating ray reflection preventing means positioned between said portion of said stimulable phosphor sheet scanned by said stimulating rays and said light guide member, and
  (ii) a means for preventing transmission of said stimulating rays and transmitting the light emitted by said stimulable phosphor sheet in proportion to the radiation energy stored, said means being positioned between said portion of said stimulable phosphor sheet scanned by said stimulating rays and said photoelectric converter.

2. An apparatus as defined in claim 1 wherein said stimulating ray reflection preventing means is a stimulating ray reflection preventing film positioned on said light input face of said light guide member, and said means for preventing transmission of said stimulating rays and transmitting the light emitted by said stimulable phosphor sheet is a filter positioned at said photoelectric converter for selectively transmitting the light emitted by said stimulable phosphor sheet.

3. An apparatus as defined in claim 2 wherein said stimulating ray reflection preventing film is a deposited thin film of a material exhibiting a refractive index smaller than the reference index of the material of said light guide member.

4. An apparatus as defined in claim 3 wherein the optical thickness of said deposited thin film is a quarter of the wavelength of said stimulating rays.

5. An apparatus as defined in claim 3 wherein the material of said deposited thin film and the material of said light guide member satisfy the condition $n1 = \sqrt{n2}$ where n1 denotes the refractive index of the material of said deposited thin film and n2 denotes the refractive index of the material of said light guide member.

6. An apparatus as defined in claim 2 wherein said stimulating ray reflection preventing film also prevents reflection of said light emitted by said stimulable phosphor sheet.

7. An apparatus as defined in claim 1 wherein said stimulating ray reflection preventing means and said means for preventing transmission of said stimulating rays and transmitting the light emitted by said stimulable phosphor sheet are constituted by a filter for absorbing the stimulating rays reflected by said stimulable phosphor sheet and transmitting said light emitted by said stimulable phosphor sheet, said filter being positioned between said portion of said stimulable phosphor sheet scanned by said stimulating rays and said light input face of said light guide member.

8. An apparatus as defined in claim 7 wherein said filter is a wavelength selection transmitting filter.

9. An apparatus as defined in claim 7 wherein said filter is closely contacted with said light input face of said light guide member.

10. An apparatus as defined in claim 7 wherein a reflection mirror is positioned on the side opposite to said light guide member with respect to said portion of said stimulable phosphor sheet scanned by said stimulating rays so that said reflection mirror reflects said light emitted by said stimulable phosphor sheet to said light guide member.

* * * * *